US007137141B1

(12) United States Patent  (10) Patent No.: US 7,137,141 B1
McClanahan  (45) Date of Patent: Nov. 14, 2006

(54) SINGLE SIGN-ON TO AN UNDERLYING OPERATING SYSTEM APPLICATION

(75) Inventor: Mark Gregory McClanahan, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 1301 days.

(21) Appl. No.: 09/640,839

(22) Filed: Aug. 16, 2000

(51) Int. Cl.
*G06F 7/04* (2006.01)
*G06F 7/54* (2006.01)
*G06F 15/16* (2006.01)
*G06F 17/30* (2006.01)
*G06K 9/00* (2006.01)
*G06K 19/00* (2006.01)
*H04L 9/32* (2006.01)

(52) U.S. Cl. ....................................................... 726/8
(58) Field of Classification Search ................. 713/202
See application file for complete search history.

(56) References Cited

U.S. PATENT DOCUMENTS

| 5,241,594 | A | 8/1993 | Kung ............................ 380/4 |
| 5,684,950 | A | 11/1997 | Dare et al. ............. 395/187.01 |
| 5,708,832 | A | 1/1998 | Inniss et al. ................ 395/800 |
| 5,768,504 | A | 6/1998 | Kells et al. ............ 395/187.01 |
| 5,884,312 | A | 3/1999 | Dustan et al. ................ 707/10 |
| 5,935,251 | A | 8/1999 | Moore ......................... 713/202 |
| 5,944,824 | A | 8/1999 | He .............................. 713/201 |

FOREIGN PATENT DOCUMENTS

| JP | 10-269184 | 10/1998 |
| JP | 11-25048 | 1/1999 |

OTHER PUBLICATIONS

"Safe Single-Sign-On Protocol with Minimal Password Exposure No-Decryption, and Technology-Adaptivity," *IBM Technical Disclosure Bulletin*, vol. 38 No. 03, Mar. 1995, pp. 245-248.
"Logon Assist for Multiple Logons," *IBM Technical Disclosure Bulletin*, vol. 32 No. 8A, Jan. 1990, pp. 303-315.
"Method to Recognize a User Who Has Logged On to a Network Through Windows, DOS LAN Requester Command Line or DOS LAN Requester Full-Screen Interface," *IBM Technical Disclosure Bulletin*, vol. 34 No. 10B, Mar. 1992, p. 359.

*Primary Examiner*—Kambiz Zand
*Assistant Examiner*—Benjamin E. Lanier
(74) *Attorney, Agent, or Firm*—Robert A. Voigt, Jr.; Winstead Sechrest & Minick P.C.

(57) ABSTRACT

A method and computer program product for bypassing the initial sign-on of an underlying operating system with single sign-on capability. In one embodiment, a method comprises the step of providing an application framework which logs on a user with a first level of access in the underlying operating system thereby bypassing the initial sign-on screen of the underlying operating system. The method further comprises entering a logon input, e.g., userID and password, on a generated application framework sign-on screen by the user. The method further comprises comparing the logon input with an application framework security database to determine the level of access. If the user is only entitled to the first level of access, then the user is restricted to a first level of access. If the user is entitled to another level of access, then a switch user program may be executed to switch the level of access to a second level of access, i.e., change in the assortment and/or number of applications. In another embodiment, the user selects an icon to maintain a first level of access upon entering the logon input. In another embodiment, the user selects an icon to change the level of access upon entering the logon input.

81 Claims, 4 Drawing Sheets

SINGLE SIGN-ON TO AN UNDERLYING OPERATING SYSTEM APPLICATION

TECHNICAL FIELD

The present invention relates to the field of data processing systems, and more particularly to a computer program product and method for bypassing the initial sign-on screen of an underlying operating system with single sign-on capability.

BACKGROUND INFORMATION

Computer users are demanding flexible and sophisticated techniques in hardware and software implementations. This flexibility and sophistication are readily evident in evolving systems which alleviate requiring users to log on multiple times to a system. Typically a user identifies him/herself to the system by providing his/her userID and password. User management services will check the profile of the specified user and verify that the password provided is that of the named user. If the password is correct for the user, the user is marked as logged on and may subsequently access authorized system objects. The user may subsequently have to log on again perhaps with a different userID and password to access an application, e.g., word processing program, electronic mail, etc., after the user has logged onto the system. A recent study revealed that the average user of four applications spends approximately 44.4 hours per year just logging onto those applications. If the same user had a single sign-on capability, the time required to log onto the four applications would be reduced to approximately 17 hours per year. Single sign-on denotes the process by which the user presents a userID and password only once to access multiple applications or systems.

A system with single sign-on capability has been implemented by Hewlett Packard Company with the Windows operating system (Windows is a registered trademark of the Microsoft Corporation). The single sign-on is accomplished by taking advantage of what are known as "hooks" which enable calls to be made to call back functions when specified events occur such as the activation of a window. Such a hook enables a dynamic-link library (DLL) to automatically be inserted into an executing application program. A DLL file is one that contains one or more functions that are compiled, linked and stored separately from application processes that use them. Upon a call being made to a DLL, the Windows Operating System maps the DLL data into the process's address space when the process is either starting or running. By storing the correct input sequence in the DLL for logging onto an application and associating that input sequence with the applications logon dialog box, the user is able to automatically be logged onto an application once the user has successfully logged onto the Windows Operating System.

Unfortunately the user must log onto the underlying operating system, such as Windows 2000 or Windows NT, prior to accessing an application. It would therefore be desirable to bypass the initial sign-on screen of the underlying operating system so that the user signs on directly to the application environment while maintaining a single sign-on capability. It would further be desirable to change the level of access, i.e., change the assortment and/or number of applications the user has access to utilize, while maintaining a single sign-on capability.

SUMMARY

The problems outlined above may at least in part be solved in some embodiments by providing an application framework which logs a user with a first level of access in the underlying operating system thereby bypassing the initial sign-on screen of the underlying operating system. The user will then enter a logon input, e.g., userID and password, on an application framework sign-on screen. Upon the user entering the logon input, the application framework compares the logon input with an application framework security database to determine the level of access. If the user is only entitled to the first level of access, then the user is restricted to a first level user. If the user is entitled to another level of access, then a switch user program may be executed to switch the level of access to a second level of access, e.g., change in the assortment and/or number of applications.

In one embodiment, a method of bypassing an initial sign-on screen of an underlying operating system with a single sign-on capability comprises the step of providing an application framework where the application framework logs on a user with a first level of access in the underlying operating system thereby bypassing the initial sign-on screen of the underlying operating system. The method further comprises entering a logon input, e.g., userID and password, by the user on a generated application framework sign-on screen. The method further comprises selecting an indication, e.g., icon, of the first level of access by the user. The method further comprises comparing the logon input with an application framework security database to determine the level of access. The user is then logged onto the underlying operating system and an application environment with a first level of access. If the logon input entered by the user corresponds to a user defined by the application framework security database as having one or more additional levels of access, then an indicator, e.g., icon, is generated which will allow the user to access a second level of access. Upon the selection of the indicator, a switch user program is executed to switch the user to the second level of access. If the logon input entered by the user is defined by the application framework security database as having access only to the first level of access, then the user is restricted to the first level of access.

In another embodiment of the present invention, a method of bypassing an initial sign-on screen of an underlying operating system with a single sign-on capability comprises the step of providing an application framework where the application framework logs on a user with a first level of access in the underlying operating system thereby bypassing the initial sign-on screen of the underlying operating system. The method further comprises entering a logon input, e.g., userID and password, by the user on a generated application framework sign-on screen. The method further comprises selecting an indication, e.g., icon, of a second level of access by the user. The method further comprises comparing the logon input with an application framework security database to determine the level of access. If the user is authorized to access one or more additional levels of access, a switch user program is executed to switch the user to the second level of access. If the user is only authorized to access the first level of access, the user is restricted to the first level of access.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method and computer program product for bypassing an initial sign-on screen of an underlying operating system, e.g., Windows 2000, Windows NT, with a single sign-on capability. In one embodiment of the present invention a method comprises the steps of providing an application framework where the application framework logs on a user with a first level of access in the underlying operating system. The method further comprises generating an application framework sign-on screen where the user may enter a logon input such as a user name and password. The method further comprises comparing the logon input with an application framework security database to determine the level of access. If the user is authorized to switch the level of access, a switch user program is executed to switch the user to a second level of access. If the user is not authorized to switch the level of access, then the user is restricted to the first level of access. In another embodiment of the present invention, the user selects an icon to maintain the first level of access upon entering the logon input. In another embodiment of the present invention, the user selects an icon to change the level of access upon entering the logon input.

Figure 1:
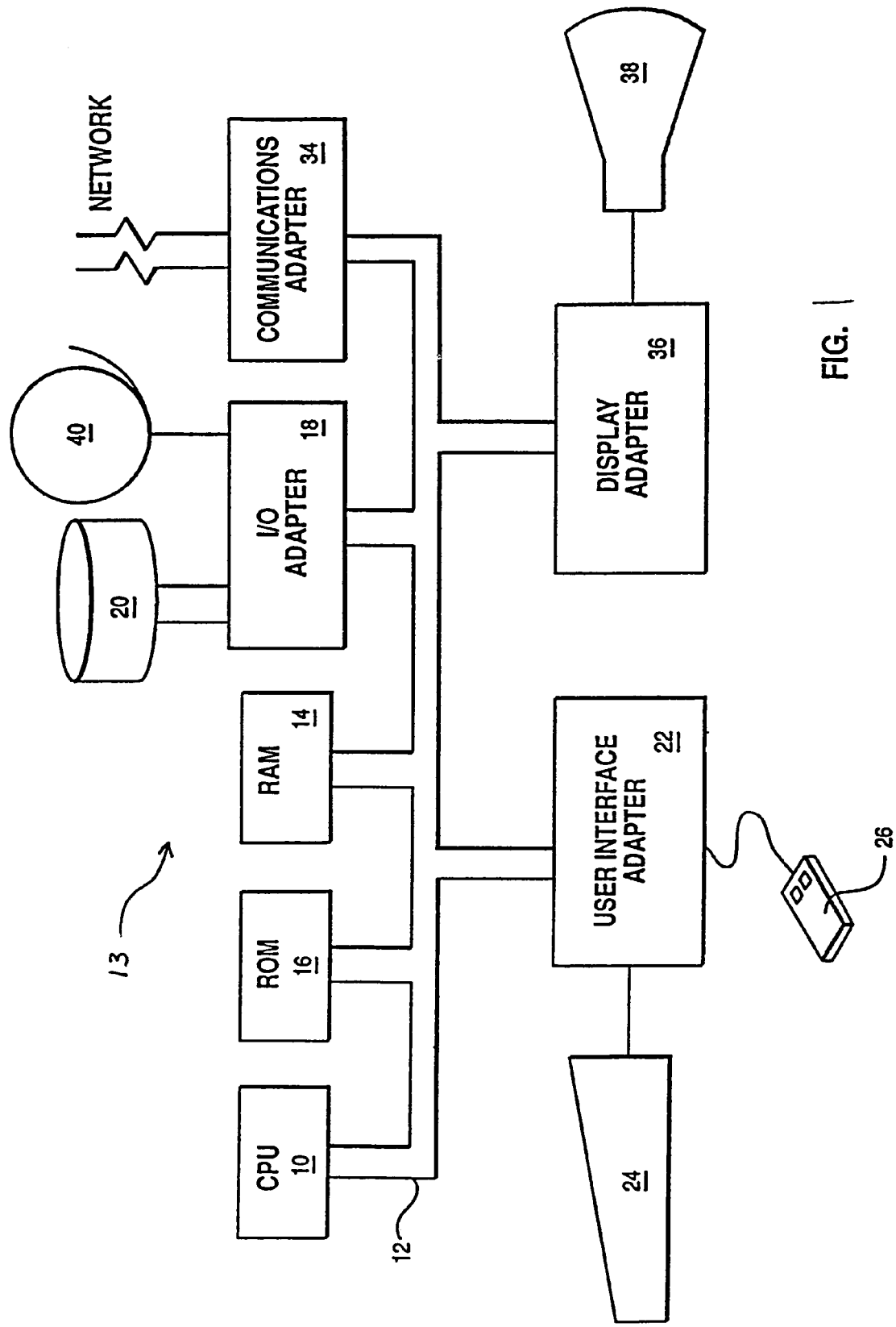
FIG. 1 illustrates a data processing system configured in accordance with the present invention.

FIG. 1—Computer System

FIG. 1 illustrates a typical hardware configuration of data processing system 13 which is representative of a hardware environment for practicing the present invention. Data processing system 13 has a central processing unit (CPU) 10, such as a conventional microprocessor, coupled to various other components by system bus 12. Read only memory (ROM) 16 is coupled to system bus 12 and includes a basic input/output system ("BIOS") that controls certain basic functions of data processing system 13. Random access memory (RAM) 14, I/O adapter 18, and communications adapter 34 are also coupled to system bus 12. I/O adapter 18 may be a small computer system interface ("SCSI") adapter that communicates with disk units 20 and tape drives 40. Communications adapter 34 interconnects bus 12 with an outside network enabling data processing system 13 to communication with other such systems. Input/Output devices are also connected to system bus 12 via a user interface adapter 22 and a display adapter 36. A display monitor 38 is connected to system bus 12 by display adapter 36. In this manner, a user is capable of inputting to system 13 through a keyboard 24 or a mouse 26 and receiving output from system 13 via display 38.

Preferred implementations of the invention include implementations as a computer system programmed to execute the method or methods described herein, and as a computer program product. According to the computer system implementations, sets of instructions for executing the method or methods are resident in the random access memory 14 of one or more computer systems configured generally as described above. Until required by the computer system, the set of instructions may be stored as a computer program product in another computer memory, for example, in disk drive 20 (which may include a removable memory such as an optical disk or floppy disk for eventual use in disk drive 20). Furthermore, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 2:
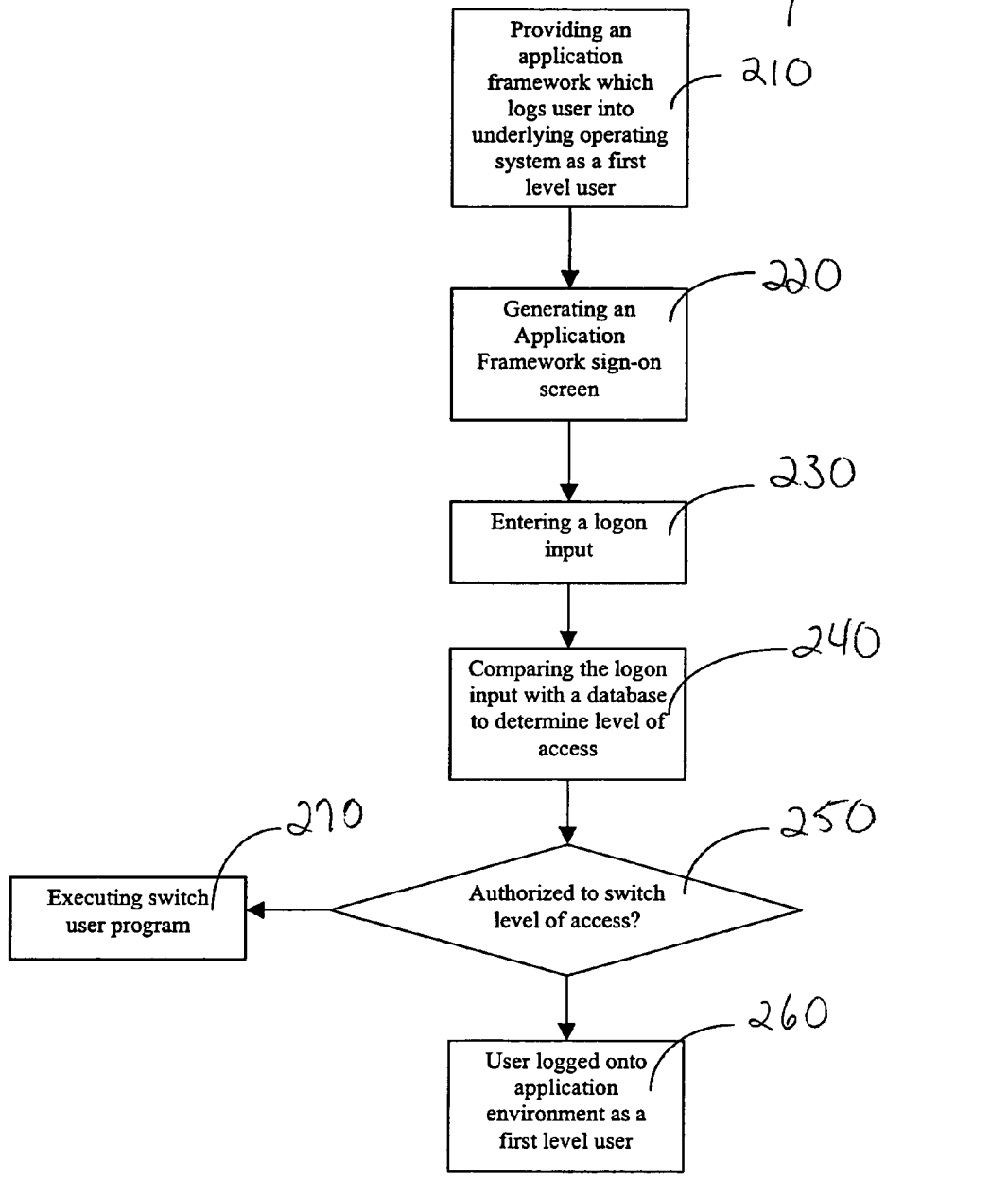
FIG. 2 is a flowchart depicting a method for bypassing the initial sign-on screen of an underlying operating system and comparing a logon input with a database to determine a user's level of access with single sign-on capability.

FIG. 2—Flowchart of a Method of Bypassing the Initial Sign-On Screen of an Underlying Operating System with Single Sign-On Capability FIG. 2 illustrates a flowchart of one embodiment of the present invention of a method 200 for bypassing the initial sign-on screen of an underlying operating system, e.g., Windows 2000, Windows NT, with single sign-on capability. Data processing system 13 typically includes an operating system within a kernal having a plurality of operating system functions. In step 210, an application framework logs the user into the underlying operating system with a first level of access thereby bypassing the initial sign-on screen of the underlying operating system. An application framework resides in memory of data processing system 13 which controls the environment, e.g., icons, etc., the user sees. That is, the application framework controls what applications are accessible to the particular user. Level of access refers to the assortment and/or number of applications the user has access to utilize. The first level of access may be the lowest level in terms of the assortment and/or number of applications a user of that access has to utilize. For example, the underlying operating system, e.g., Windows NT, may have two levels of access, e.g., one level of access for a restricted user and another level of access for an administration user. The restricted user may have the lowest level of access and the administration user may have the highest level of access. It is noted that the application framework and the underlying operating system may assign any number of levels of access for any number of users.

An application framework may log the user into the underlying operating system, e.g., Windows NT, with a first level of access, e.g., restricted user, thereby bypassing the initial sign-on screen of the underlying operating system in step 210 by modifying the underlying system's registry. The registry is a database in which configuration information is registered for the underlying operating system. The following routine illustrates one embodiment of modifying the underlying system's registry.

```
long setAutoLogonId( char * userID, char * password )
{
    // ************************************************************
    // Query registry entries to retrieve parameters.
    // ************************************************************
    char szKey[MAX_PATH_LENGTH+1];
    sfRegistryEntry registryEntry;
    long rc = 0;
    // Key: "Software\\Microsoft\\Windows NT\\CurrentVersion\\Winlogon"
    strcpy(szKey, "Software\\Microsoft\\Windows
    NT\\CurrentVersion\\Winlogon");
    // Open key
    if (registryEntry.Open(szKey))
    {
        // ************************************************************
        // set AutoAdminLogon in registry. Type must be REG_SZ.
        // ************************************************************
        if (registryEntry.SetValue("AutoAdminLogon",
                     "1", REG_SZ) == ERROR_SUCCESS)
        {
            printf("AutoAdminLogon set ON \n");
        }
        else
        {
            rc = GetLastError( );
            printf("Error: AutoAdminLogon setvalue rc = %d\n",rc);
        }
        // ************************************************************
        // set DefaultUserName in registry. Type must be REG_SZ.
        // ************************************************************
        if (registryEntry.SetValue ("DefaultUserName",
                     userID, REG_SZ) == ERROR_SUCCESS)
        {
            printf("DefaultUserName set to %s \n", userID);
        }
        else
        {
            rc = GetLastError( );
            printf("Error: DefaultUserName setvalue rc = %d\n",rc);
        }
        // ************************************************************
        // set DefaultPassword in registry. Type must be REG_SZ.
        // ************************************************************
        if (registryEntry.SetValue("DefaultPassword",
                     password, REG_SZ) == ERROR_SUCCESS)
        {
            printf("DefaultPassword set \n");
        }
        else
        {
            rc = GetLastError( );
            printf("Error: DefaultPassword setvalue rc = %d\n",rc);
        }
        registryEntry.Close( );
    }
    return rc;
}
```

Once the application framework logs the user into the underlying operating system, an application framework sign-on screen is generated in step 220. In step 230, the user enters a logon input, e.g., a userID and password, on the generated application framework sign-on screen. In step 240, the application framework compares the userID and password entered by the user with a database commonly referred to as an application framework security database to determine the level of access of the user. The application framework security database stores system operator information such as defining the users, passwords, groups of users and application specific authorization.

A determination is made by the application framework in step 250 as to whether the user is authorized to access one or more additional levels of access from the comparison of the logon input entered by the user in step 230 and the application framework security database. If the logon input entered by the user in step 230 corresponds to a user defined by the application framework security database as only having access to the first level of access, then the user is restricted to a first level of access in step 260. However, if the logon input entered by the user in step 230 corresponds to a user defined by the application framework security database as having one or more additional levels of access, then a switch user program is executed in step 270. The switch user program may reside in various memory locations in data processing system 13 such as a subdirectory on any disk 20. The switch user program switches the user to another level of access by modifying the underlying operating system's registry. The registry is a database in which configuration information is registered for the underlying operating system. Once the registry is modified to log on the user with a different level of access, the switch user program logs off the user and the underlying operating system logs on the user with the new level of access.

Figure 3:
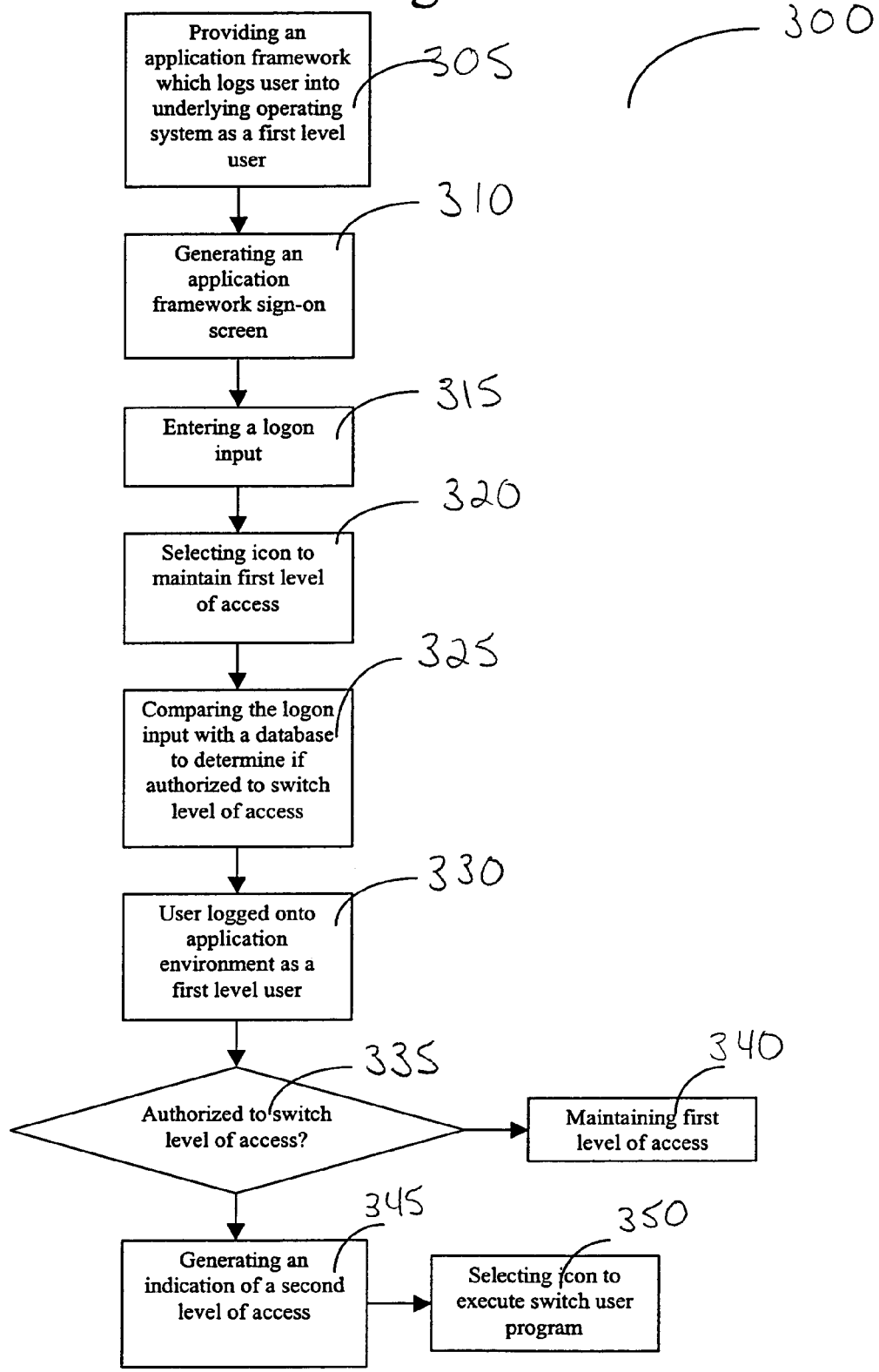
FIG. 3 is a flowchart depicting a method for bypassing the initial sign-on screen of an underlying operating system and executing a switch user program to switch the level of access after a user initially selects a first level of access with single sign-on capability.

FIG. 3—Flowchart of a Method Implementing Switch User Program After User Initially Selects a First Level of Access FIG. 3 illustrates a method 300 according to an embodiment of the present invention. FIG. 3 is a method 300 of bypassing the initial sign-on screen for the underlying operating system and executing a switch user program to switch the level of access of the user after the user initially selects a first level of access with single sign-on capability. In step 305, the application framework logs the user into the underlying operating system with a first level of access, e.g., restricted user, thereby bypassing the initial sign-on screen of the underlying operating system. The application framework may bypass the initial sign-on screen of the underlying operating system by modifying the underlying system's registry. The registry is a database in which configuration information is registered for the underlying operating system. An embodiment of a routine for modifying the underlying system's registry is disclosed in the detailed description of FIG. 2. In step 310, an application framework sign-on screen is generated. In step 315, the user enters a logon input, e.g., a userID and password, on the generated application framework sign-on screen.

In step 320, the user may select an indicator, e.g., icon, to maintain a first level of access, such as by clicking on a button, that appears on the application framework sign-on screen. As stated above, the first level of access may be the lowest level of access in terms of the assortment and/or number of applications a user of that access has to utilize. In step 325, the application framework compares the logon information the user entered in step 315, such as a userID and password, with an application framework security database to determine if the user is authorized to switch level of access. As stated above, the application framework security database stores system operator information such as defining the users, passwords, groups of users and application specific authorization.

The user is then logged onto an application environment, e.g., retail application environment, as a first level user in step 330. Once logged onto the application environment, an application framework desktop appears. The application framework desktop refers to the screen the user sees with the icons of various applications the user may utilize. The application framework desktop initially shown would be for a user with a first level of access as the user selected the indicator of the first level of access in step 320. Therefore, the user is logged onto both the underlying operating system and the application environment with a first level of access thereby bypassing the initial sign-on screen of the underlying operating system with single sign-on capability.

A determination is made by the application framework in step 335 as to whether the user is authorized to access one or more additional levels of access from the comparison of the logon input entered by the user in step 315 and the application framework security database. If the logon input entered by the user in step 315 corresponds to a user defined by the application framework security database as only having access to the first level of access, then the user is restricted to the first level of access in step 340. However, if the logon input entered by the user in step 315 corresponds to a user defined by the application framework security database as having one or more additional levels of access, then an indicator such as an icon is generated on the application framework desktop which will allow the user to access the one or more additional levels of access the user is authorized to access in step 345.

In step 350, the user may select the indicator to access another level of access, e.g., clicking on an icon, which executes a switch user program. The switch user program may reside in various memory locations in data processing system 13 such as a subdirectory on any disk 20. The switch user program switches the user to another level of access by modifying the underlying operating system's registry. The registry is a database in which configuration information is registered for the underlying operating system. Once the registry is modified to log on the user with a different level of access, the switch user program logs off the user and the underlying operating system logs on the user with the new level of access.

Figure 4:
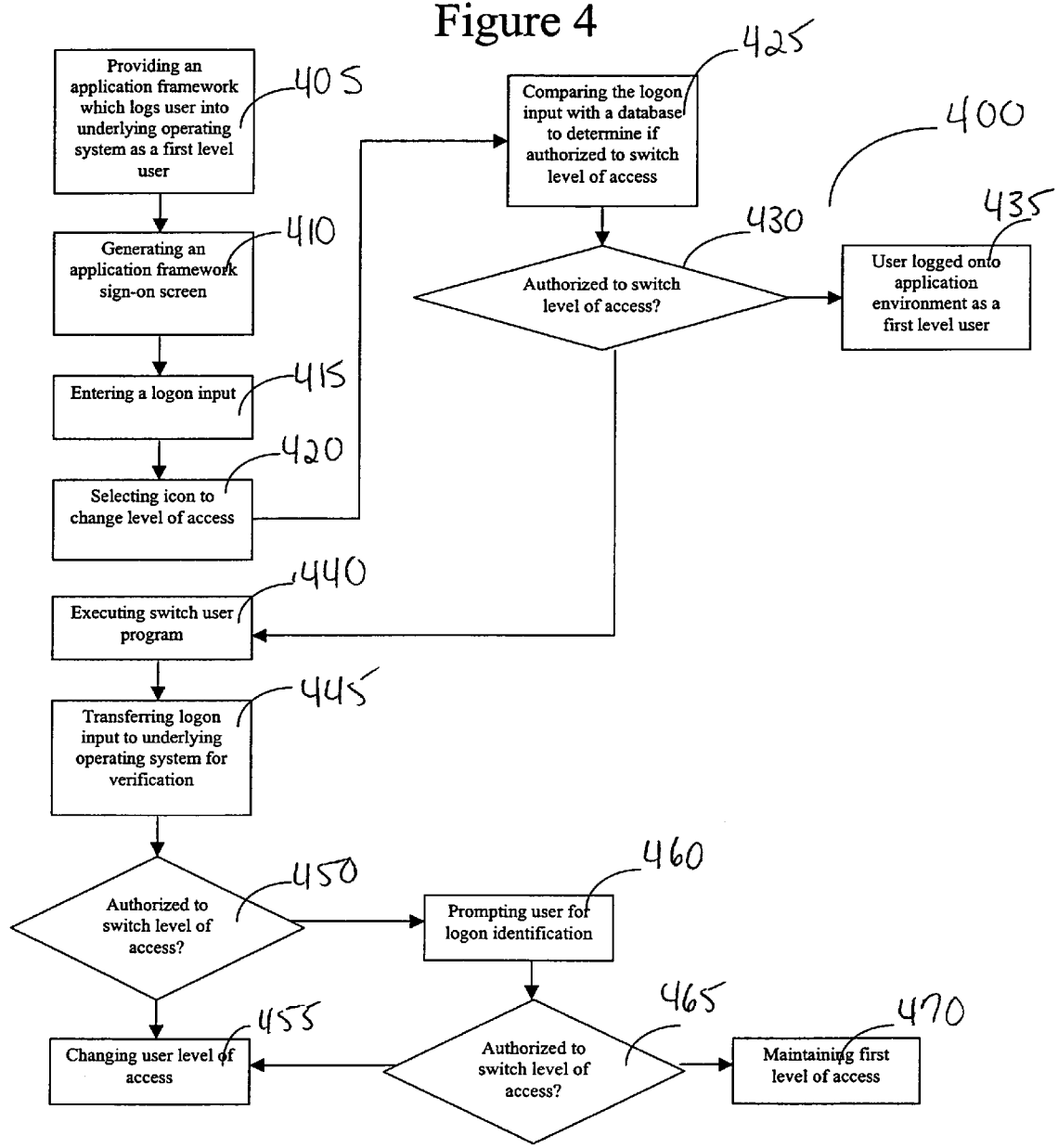
FIG. 4 is a flowchart depicting a method for bypassing the initial sign-on screen of an underlying operating system and executing a switch user program to switch the level of access after a user initially selects a second level of access with single sign-on capability.

FIG. 4—Flowchart of a Method Implementing Switch User Program After User Initially Selects a Second Level of Access FIG. 4 illustrates a method 400 according to an embodiment of the present invention. FIG. 4 is a method 400 of bypassing the initial sign-on screen for the underlying operating system and executing a switch user program to switch the level of access of the user after the user initially selects a second level of access with single sign-on capability. In step 405, the application framework logs the user into the underlying operating system with a first level of access, e.g., restricted user, thereby bypassing the initial sign-on screen of the underlying operating system. The application framework may bypass the initial sign-on screen of the underlying operating system by modifying the underlying system's registry. The registry is a database in which configuration information is registered for the underlying operating system. An embodiment of a routine for modifying the underlying system's registry is disclosed in the detailed description of FIG. 2. In step 410, an application framework sign-on screen is generated. In step 415, the user enters a logon input, e.g., a userID and password, on the generated application framework sign-on screen.

In step 420, the user may select an indicator, e.g., icon, to change the level of access to a second level of access, such as by clicking on a button, that appears on the application framework sign-on screen. The second level of access, e.g., administrative user, may be a level of access with an additional assortment and/or number of applications versus a first level of access, e.g., restricted user.

In step 425, the application framework compares the logon information the user entered in step 415, such as a userID and password, with an application framework security database to determine if the user is authorized to switch level of access. As stated above, the application framework security database stores system operator information such as defining the users, passwords, groups of users and application specific authorization.

A determination is made by the application framework in step 430 as to whether the user is authorized to access one or more additional levels of access from the comparison of the logon input entered by the user in step 415 and the application framework security database. If the logon input entered by the user in step 415 corresponds to a user defined by the application framework security database as only having access to the first level of access, then the user is logged onto an application environment, e.g., retail application environment, as a first level user in step 435. Once logged onto the application environment, an application framework desktop appears. As stated above, the application framework desktop refers to the screen the user sees with the icons of various applications the user may utilize. The application framework desktop shown would be for a user with a first level of access.

However, if the logon input entered by the user in step 415 corresponds to a user defined by the application framework security database as having one or more additional levels of access, then the switch user program is executed in step 440. As stated above, the switch user program may reside in various memory locations in data processing system 13 such as a subdirectory on any disk 20. After the switch user program is executed, the switch user program transfers logon input, such as a userID and password, to the underlying operating system for verification in step 445. In step 450, the underlying operating system determines whether the user has another level of access. In one embodiment, the underlying operating system may compare the logon input with an underlying operating system security database. The underlying operating system security database may be similar to the application framework security database.

If the user is entitled to access another level of access, e.g., administrative access, then the user level of access is changed to another level of access in step 455. The user's level of access is changed by the switch user program modifying the underlying operating system's registry. The registry is a database in which configuration information is registered for the underlying operating system. Once the registry is modified to log on the user with a different level of access, the switch user program logs off the user and the underlying operating system logs on the user with the new level of access.

If the underlying operating system in step 450 determines that the user is not entitled to another level of access, then the underlying operating system may prompt the user for logon identification, e.g., a userID and password in step 460. The underlying operating system makes another determination in step 465 as to whether the user has access to another level of access. In an embodiment of the present invention, the underlying operating system may determine whether the user has access to another level of access by comparing the logon identification with a database. If the user is entitled to access another level of access, e.g., administrative access, then the user level of access is changed in step 455. The user's level of access is changed by the switch user program modifying the underlying operating system's registry. The registry is a database in which configuration information is registered for the underlying operating system. Once the registry is modified to log on the user with a different level of access, the switch user program logs off the user and the underlying operating system logs on the user with the new level of access.

If the underlying operating system in step 465 determines that the user is not entitled to another level of access, then the user is restricted to the first level of access, e.g., restricted user, in step 470.

Although the method and computer program product of the present invention is described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims. It is noted that the headings are used only for organizational purposes and not meant to limit the scope of the description or claims.

The invention claimed is:

1. A method of bypassing an initial sign-on screen of an underlying operating system with a single sign-on capability comprising the steps of:
   providing an application framework, wherein said application framework logs on a user with a first level of access in said underlying operating system;
   generating an application framework sign-on screen;
   entering a logon input on said generated application framework sign-on screen; and
   comparing said logon input with an application framework security database to determine level of access.

2. The method as recited in claim 1 further comprising the step of:
   selecting an indication of said first level of access.

3. The method as recited in claim 1, wherein said user is logged onto said underlying operating system and an application environment with said first level of access thereby bypassing said initial sign-on screen of said underlying operating system with said single sign-on.

4. The method as recited in claim 1, wherein if said logon input is not entitled to a second level of access according to said application framework security database, then said user is logged onto an application environment and said underlying operating system as said first level of access.

5. The method as recited in claim 1, wherein said logon input comprises a user identification and a user password.

6. The method as recited in claim 1, wherein if said logon input is entitled to a second level of access according to said application framework security database, then the method further comprises the step of:
   executing a switch user program to switch said user to said second level of access.

7. The method as recited in claim 1, wherein said application framework security database stores system operator information, wherein said application framework security database defines at least one of the following: users, passwords, groups of users and application specific authorization.

8. The method as recited in claim 7, wherein said a switch user program switches said user to said second level of access by modifying an underlying operating system's registry.

9. The method as recited in claim 8, wherein said switch user program logs off said user with said first level of access, wherein said underlying operating system logs on said user with said second level of access.

10. The method as recited in claim 2, wherein if said logon input is not entitled to a second level of access according to said application framework security database, then an indication of said second level of access will not be generated to said user, wherein said user is restricted to said first level of access.

11. The method as recited in claim 2, wherein if said logon input is entitled to a second level of access according to said application framework security database, then the method further comprises the step of:
   generating an indication of said second level of access.

12. The method as recited in claim 11 further comprising the step of:
   executing a switch user program to switch level of access to said second level of access by selecting said indication of said second level of access.

13. The method as recited in claim 12, wherein said switch user program switches said user to said second level of access by modifying an underlying operating system's registry.

14. The method as recited in claim 13, wherein said switch user program logs off said user with said first level of access, wherein said underlying operating system logs on said user with said second level of access.

15. The method as recited in claim 1 further comprising the step of:
   selecting an indication of a second level of access.

16. The method as recited in claim 15, wherein if said logon input is not entitled to said second level of access according to said application framework security database, then said user is restricted to said first level of access.

17. The method as recited in claim 15, wherein if said logon input is entitled to said second level of access according to said application framework security database, then the method further comprises the step of:
   executing a switch user program to switch said user to said second level of access.

18. The method as recited in claim 17 further comprising the step of:
   transferring said logon input to said underlying operating system for verification.

19. The method as recited in claim 18 further comprising the step of:
   comparing said logon input with an underlying operating system security database, wherein if said underlying operating system security database verifies said user with access to said second level of access, then said switch user program switches said user to said second level of access.

20. The method as recited in claim 19, wherein said switch user program switches said user to said second level of access by modifying an underlying operating system's registry.

21. The method as recited in claim 20, wherein said switch user program logs off said user with said first level of access, wherein said underlying operating system logs on said user with said second level of access.

22. The method as recited in claim 18 further comprising the step of:
   comparing said logon input with an underlying operating system security database, wherein if said underlying operating system security database does not verify said user with access to said second level of access, then the method further comprises the step of:
   requesting from said user a logon identification; and
   comparing said logon identification with said underlying operating system security database.

23. The method as recited in claim 22, wherein said logon identification comprises a user identification and a user password.

24. The method as recited in claim 22, wherein if said underlying operating system security database does not verify said user with access to said second level of access, then said user is restricted to said first level of access.

25. The method as recited in claim 22, wherein if said underlying operating system security database verifies said user with access to said second level of access, then said switch user program switches said user to said second level of access.

26. The method as recited in claim 25, wherein said switch user program switches said user to said second level of access by modifying an underlying operating system's registry.

27. The method as recited in claim 26, wherein said switch user program logs off said user with said first level of access, wherein said underlying operating system logs on said user with said second level of access.

28. A computer program product having a computer readable medium having computer program logic recorded thereon for bypassing an initial sign-on screen of an underlying operating system with a single sign capability, comprising:
 programming operable for providing an application framework, wherein said application framework logs on a user with a first level of access in said underlying operating system;
 programming operable for generating an application framework sign-on screen;
 programming operable for receiving a logon input entered on said generated application framework sign-on screen; and
 programming operable for comparing said logon input with an application framework security database to determine level of access.

29. The computer program product as recited in claim 28 further comprises:
 programming operable for selecting an indication of said first level of access.

30. The computer program product as recited in claim 28, wherein said user is logged onto said underlying operating system and an application environment with said first level of access thereby bypassing said initial sign-on screen of said underlying operating system with said single sign-on.

31. The computer program product as recited in claim 28, wherein if said logon input is not entitled to a second level of access according to said application framework security database, then said user is restricted to said first level of access.

32. The computer program product as recited in claim 28, wherein said logon input comprises a user identification and a user password.

33. The computer program product as recited in claim 28, wherein said application framework security database stores system operator information, wherein said application framework security database defines at least one of the following: users, passwords, groups of users and application specific authorization.

34. The computer program product as recited in claim 28, wherein if said logon input is entitled to a second level of access according to said application framework security database, then the computer program product further comprises:
 programming operable for executing a switch user program to switch said user to said second level of access.

35. The computer program product as recited in claim 34, wherein said switch user program switches said user to said second level of access by modifying an underlying operating system's registry.

36. The computer program product as recited in claim 35, wherein said switch user program logs off said user with said first level of access, wherein said underlying operating system logs on said user with said second level of access.

37. The computer program product as recited in claim 29, wherein if said logon input is not entitled to a second level of access according to said application framework security database, then an indication of said second level of access will not be generated to said user, wherein said user is restricted to said first level of access.

38. The computer program product as recited in claim 29, wherein if said logon input is entitled to a second level of access according to said application framework security database, then the computer program product further comprises:
 programming operable for generating an indication of said second level of access.

39. The computer program product as recited in claim 38 further comprises:
 programming operable for executing a switch user program to switch level of access to said second level of access by selecting said indication of said second level of access.

40. The computer program product as recited in claim 39, wherein said switch user program switches said user to said second level of access by modifying an underlying operating system's registry.

41. The computer program product as recited in claim 40, wherein said switch user program logs off said user with said first level of access, wherein said underlying operating system logs on said user with said second level of access.

42. The computer program product as recited in claim 28 further comprises:
 programming operable for selecting an indication of a second level of access.

43. The computer program product as recited in claim 42, wherein if said logon input is not entitled to said second level of access according to said application framework security database, then said user is restricted to said first level of access.

44. The computer program product as recited in claim 42, wherein if said logon input is entitled to said second level of access according to said application framework security database, then the computer program product further comprises:
 programming operable for executing a switch user program to switch said user to said second level of access.

45. The computer program product as recited in claim 44 further comprises:
 programming operable for transferring said logon input to said underlying operating system for verification.

46. The computer program product as recited in claim 45 further comprises:
 programming operable for comparing said logon input with an underlying operating system security database, wherein if said underlying operating system security database verifies said user with access to said second level of access, then said switch user program switches said user to said second level of access.

47. The computer program product as recited in claim 46, wherein said switch user program switches said user to said second level of access by modifying an underlying operating system's registry.

48. The computer program product as recited in claim 47, wherein said switch user program logs off said user with said first level of access, wherein said underlying operating system logs on said user with said second level of access.

49. The computer program product as recited in claim 45 further comprises:
 programming operable for comparing said logon input with an underlying operating system security database, wherein if said underlying operating system security database does not verify said user with access to said second level of access, then the computer program product further comprises:
 programming operable for requesting from said user a logon identification; and
 programming operable for comparing said logon identification with said underlying operating system security database.

50. The computer program product as recited in claim 49, wherein said logon identification comprises a user identification and a user password.

51. The computer program product as recited in claim 49, wherein if said underlying operating system security database does not verify said user with access to said second level of access, then said user is restricted to said first level of access.

52. The computer program product as recited in claim 49, wherein if said underlying operating system security database verifies said user with access to said second level of access, then said switch user program switches said user to said second level of access.

53. The computer program product as recited in claim 52, wherein said switch user program switches said user to said second level of access by modifying an underlying operating system's registry.

54. The computer program product as recited in claim 53, wherein said switch user program logs off said user with said first level of access, wherein said underlying operating system logs on said user with said second level of access.

55. A data processing system, comprising:
 a processor;
 a memory unit operable for storing a computer program operable for bypassing an initial sign-on screen of an underlying operating system with a single sign capability;
 an input mechanism;
 an output mechanism; and
 a bus system coupling the processor to the memory unit, input mechanism, and output mechanism, wherein the computer program is operable for performing the following programming steps:
  providing an application framework, wherein said application framework logs on a user with a first level of access in said underlying operating system;
  generating an application framework sign-on screen;
  receiving a logon input entered on said generated application framework sign-on screen; and
  comparing said logon input with an application framework security database to determine level of access.

56. The data processing system as recited in claim 55, wherein the computer program is further operable to perform the programming step:
 selecting an indication of said first level of access.

57. The data processing system as recited in claim 55, wherein said user is logged onto said underlying operating system and an application environment with said first level of access thereby bypassing said initial sign-on screen of said underlying operating system with said single sign-on.

58. The data processing system as recited in claim 55, wherein if said logon input is not entitled to a second level of access according to said application framework security database, then said user is logged onto an application environment and said underlying operating system as said first level of access.

59. The data processing system as recited in claim 55, wherein said logon input comprises a user identification and a user password.

60. The data processing system as recited in claim 55, wherein said application framework security database stores system operator information, wherein said application framework security database defines at least one of the following: users, passwords, groups of users and application specific authorization.

61. The data processing system as recited in claim 55, wherein if said logon input is entitled to a second level of access according to said application framework security database, then the computer program is further operable to perform the programming step:
 executing a switch user program to switch said user to said second level of access.

62. The data processing system as recited in claim 61, wherein said switch user program switches said user to said second level of access by modifying an underlying operating system's registry.

63. The data processing system as recited in claim 62, wherein said switch user program logs off said user with said first level of access, wherein said underlying operating system logs on said user with said second level of access.

64. The data processing system as recited in claim 56, wherein if said logon input is not entitled to a second level of access according to said application framework security database, then an indication of said second level of access will not be generated to said user, wherein said user is restricted to said first level of access.

65. The data processing system as recited in claim 56, wherein if said logon input is entitled to a second level of access according to said application framework security database, then the computer program is further operable to perform the programming step:
 generating an indication of said second level of access.

66. The data processing system as recited in claim 65, wherein the computer program is further operable to perform the programming step:
 executing a switch user program to switch level of access to said second level of access by selecting said indication of said second level of access.

67. The data processing system as recited in claim 65, wherein said switch user program switches said user to said second level of access by modifying an underlying operating system's registry.

68. The data processing system as recited in claim 67, wherein said switch user program logs off said user with said first level of access, wherein said underlying operating system logs on said user with said second level of access.

69. The data processing system as recited in claim 55, wherein the computer program is further operable to perform the programming step:
 selecting an indication of a second level of access.

70. The data processing system as recited in claim 69, wherein if said logon input is not entitled to said second level of access according to said application framework security database, then said user is restricted to said first level of access.

71. The data processing system as recited in claim 69, wherein if said logon input is entitled to said second level of access according to said application framework security database, then the computer program is further operable to perform the programming step:
   executing a switch user program to switch said user to said second level of access.

72. The data processing system as recited in claim 71, wherein the computer program is further operable to perform the programming step:
   transferring said logon input to said underlying operating system for verification.

73. The data processing system as recited in claim 72, wherein the computer program is further operable to perform the programming step:
   comparing said logon input with an underlying operating system security database, wherein if said underlying operating system security database verifies said user with access to said second level of access, then said switch user program switches said user to said second level of access.

74. The data processing system as recited in claim 73, wherein said switch user program switches said user to said second level of access by modifying an underlying operating system's registry.

75. The data processing system as recited in claim 74, wherein said switch user program logs off said user with said first level of access, wherein said underlying operating system logs on said user with said second level of access.

76. The data processing system as recited in claim 72, wherein the computer program is further operable to perform the programming step:
   comparing said logon input with an underlying operating system security database, wherein if said underlying operating system security database does not verify said user with access to said second level of access, then the computer program is further operable to perform the programming steps:
   requesting from said user a logon identification; and
   comparing said logon identification with said underlying operating system security database.

77. The data processing system as recited in claim 76, wherein said logon identification comprises a user identification and a user password.

78. The data processing system as recited in claim 76, wherein if said underlying operating system security database does not verify said user with access to said second level of access, then said user is restricted to said first level of access.

79. The data processing system as recited in claim 76, wherein if said underlying operating system security database verifies said user with access to said second level of access, then said switch user program switches said user to said second level of access.

80. The data processing system as recited in claim 79, wherein said switch user program switches said user to said second level of access by modifying an underlying operating system's registry.

81. The data processing system as recited in claim 80, wherein said switch user program logs off said user with said first level of access, wherein said underlying operating system logs on said user with said second level of access.

* * * * *